June 28, 1949.  H. E. WARREN  2,474,797
REPULSION SYNCHRONOUS MOTOR
Filed Aug. 15, 1947
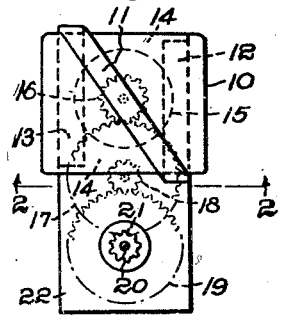
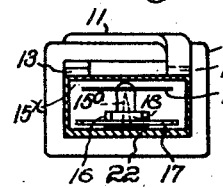
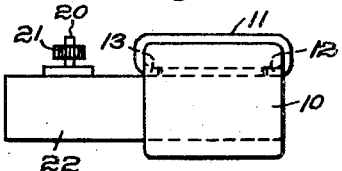
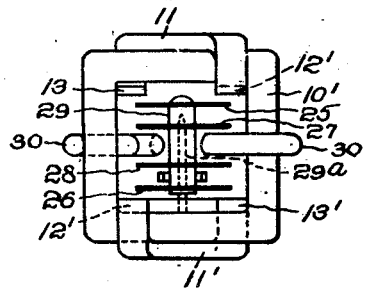
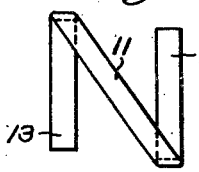
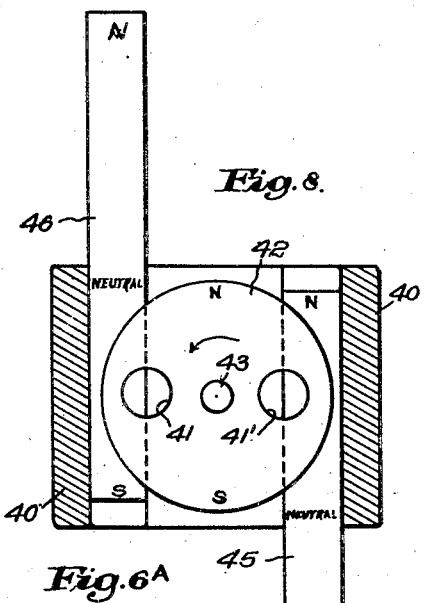
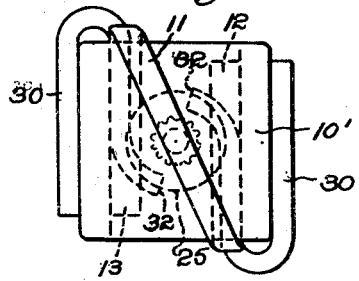
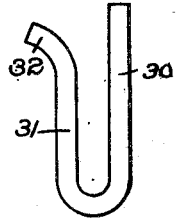
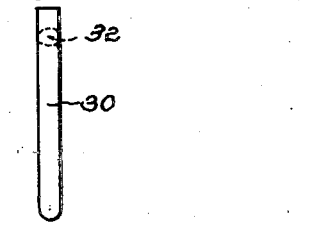
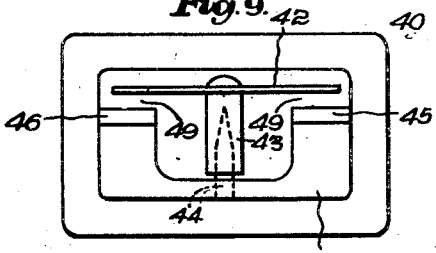
INVENTOR
HENRY E. WARREN.
BY
Emery, Booth, Townsend, Miller & Weidner
ATTORNEYS Patented June 28, 1949

2,474,797

UNITED STATES PATENT OFFICE 2,474,797

REPULSION SYNCHRONOUS MOTOR

Henry E. Warren, Ashland, Mass.

Application August 15, 1947, Serial No. 768,884

13 Claims. (Cl. 172—278)

My present invention relates to synchronous motors, especially those with self-starting capacity. It aims to provide new and improved devices of that class, of simple structural form susceptible of inexpensive manufacture. To that end the invention novelly avails of repulsion principles whereby all ordinary methods of producing a rotating magnetic field for synchronous motors are avoided and the primary driving power arises from repulsion forces set up in the rotor.

The invention in these and other respects improves upon self-starting synchronous motors utilizing remanent magnetism in hardened steel rotors, such for example as disclosed in my Patent 1,283,435, dated October 25, 1918, wherein dependence is placed on a rotating magnetic field. Heretofore such rotating magnetic field has generally been produced by shading coils or other means creative of lagging or leading flux at certain portions of the stator. In contrast therewith my present invention takes advantage of magnetic repulsion and attraction between elements in an alternating field, to provide what I will herein term repulsion synchronous motors.

In the drawings illustrating by way of example certain embodiments of the invention:

Fig. 1 is a plan view of one form of a repulsion synchronous motor with an associated gear train;

Fig. 2 is a section on the line 2—2 of Fig. 1;

Fig. 3 is a side elevation of the motor of Fig. 1;

Figs. 4 and 5 are similar views as in Figs. 2 and 1 respectively, showing another motor construction;

Figs. 6 and 6A and Figs. 7 and 7A illustrate certain pole pieces separately, in plan and in elevation; and Figs. 8 and 9 corresponding to Figs. 1 and 2 show a further embodiment of the invention.

Referring in more detail first to Figs. 1 to 3, the motor comprises a stator, field coil or winding 10 of rectangular form and adapted to carry alternating current. About one side of the winding 10, the upper portion in Figs. 2 and 3, there is wrapped a single open turn of a magnetizable metal strip or bar including a middle portion 11 and end portions 12, 13. Preferably, for maximum efficiency, this strip is of a magnetizable material which has relatively low magnetic remanence, such as a comparatively soft steel or iron, but a permanently magnetizable material has been found to give acceptable results in the practice of the invention. This strip or bar is so proportioned and arranged that the ends 12 and 13 lie parallel and within the coil 10, with an air gap between them as at 14, 14, Fig. 1. The intermediate portion 11 extends diagonally across the outside of the coil 10, see also Figs. 6 and 6A.

Within the coil 10 and adjacent to the parallel portions of the strip 11—13 is a thin disk-type rotor 15 mounted so that it may revolve freely about its axis as upon a post or pin 15a. Here again, for best results, it is desirable that at least the peripheral portion of the disk or main rotative element of this rotor be formed of a magnetizable metal of selected property as to magnetization, in this case a material of a relatively high magnetic remanence being preferred, such as a steel or iron of substantial hardness. As best seen in Fig. 2 an air gap 15x is provided between the rotor 15 and the adjacent ends 12, 13 of the strip. Thus magnetic flux can pass from the strip 11—13 into the rotor 15 while at the same time flux due to the coil 10 is also acting upon the rotor.

Under these conditions when the coil is energized by alternating current there is a strong tendency to magnetize the disk rotor in a direction parallel to the axis of the coil. At the same time there is set up in the strip strong poles across the air gap 14 in a direction having a wide angle from the axis of the coil. Through the influence of these two magnetic forces, which are approximately in phase with each other, the rotor disk 15 becomes magnetized in a direction making a considerable angle with the axis of the coil.

The manner of operation may be understood by considering a narrow diametral portion of the rotor disk, or by assuming merely for the purpose of explanation that the disk 15 is replaced by a bar like a compass needle. Such bar or diametral part under the conditions described will assume an angle with respect to the coil axis which may be as much as 40°, it being repelled from the free inside ends 12 and 13 of the strip 11. Such bar or needle would correspond to the diametral line of magnetism set up in the disk 15. While I have referred to an alternating current in the coil 10, the described effect would also be had under a direct current flowing in the coil. Should the current drop to a zero potential, the bar or needle and similarly the magnetized disk 15 would tend to align itself directly across the air gap 14, with the magnetic axis or diametral part corresponding to the needle substantially at right angles to the axis of the coil 10.

If now current in the reverse direction passes through the coil 10, the magnetized disk 15 has a strong tendency to revolve in the flow direction, that is, in the direction such as to follow the reverse flux through the coil to the opposite end.

Under this revolution of the disk the forces of repulsion at the ends 12 and 13 of the strip 11 again tend to swing the disk 15 around to a position 180° from that which it occupied at the beginning of the described cycle.

In the illustrated example a continuation of these forces acting in sequence tends to bring about rotation of the disk in a counter-clockwise direction as indicated by the arrow on Fig. 1. Generally, by reason of inertia, the disk 15 does not move immediately from rest to full synchronous speed, although it may do so under sufficiently low current frequency. At speeds below synchronous new magnetic poles are continuously being set up successively within the mass of the disk rotor 15, such action occurring until the rotor has accelerated to full synchronous speed in substantially constant phase with the current. At such later stage the poles function in effect as if fixed in position in the rotating mass.

The motion of the rotor 15 may be transmitted to the desired external location as by means of a suitable gear train such as represented in Figs. 1 and 2 including a pinion 16 on the rotor followed by a gear and pinion pair 17, 18, the latter meshing with a further gear 19 on a shaft 20 carrying a gear or pinion 21 available for driving any appropriate device such as a clock. The gear train such as shown merely by way of illustration may be enclosed in an oil-tight case 22 from which the shaft 20 projects in the example shown.

The motor as described in connection with Figs. 1 to 3 and the same applies also to the other illustrative embodiments has capacity for operation over an extensive frequency range, because the operating principles involve nothing which requires phase shift in the stator. For example, as indicated in the foregoing description, the rotor will revolve even if direct current is applied to the stator and is reversed at relatively long intervals. Alternating current motors as heretofore known could not be expected to operate under such conditions.

In the practice of the invention it is important that there be a proper proportioning of the air gap such as at 14 between the two poles 12 and 13 of the strip, on the one hand, and the air gap 15x from these poles to the disk rotor 15, on the other hand, so that the magnetic forces involved, that is, the magneto-motive force due to the winding 10 alone, and the force of repulsion as between the strip portions 12, 13 and the rotor 15, have a predetermined cooperative relationship. If the air gap 15x between the strip poles 12, 13 and the rotor 15 is too small, intense local poles may be set up in the rotor offering interference to its free revolution. Also it is of importance that the field strength due to these poles be kept sufficiently low, that is, at a strength level such that the rotor poles after becoming firmly established in position at the synchronous speed stage will not be appreciably shifted. The permissible magnetic intensity varies with the coercive property of the steel or other magnetic material and the voltage applied to the stator coil. In general, however, there is a substantial range of appropriate voltage and resultant magnetic intensity.

Figs. 4 and 5 with the related Figs. 7 and 7a illustrate a modification particularly adapted for increased power output. Here the coil 10' is proportioned internally to accommodate a plurality of disk rotors including in this instance two end rotors 25 and 26 with one or more intermediate rotors 27, 28. These are all coaxially fixed on a common arbor or shaft 29 shown as a sleeve type having rotative bearing support on a post 29a similarly as in the preceding embodiment. Operative flux for the end rotors 25 and 26 is provided by magnetizable strips respectively partly encircling the upper and the lower arms of the coil 10' in a generally similar manner as in Figs. 1 to 3, as indicated at 11, 12, 13 and 11', 12' 13' in Fig. 4; see also Fig. 5. These strips or pole pieces 11—13 and 11'—13' are in the general form of a letter N as seen in plan, one such piece being shown separately in Figs. 6 and 6A. The strip as there seen may be regarded as representative of that of the motor of Figs. 1 to 3 and also as associated with the end rotors of the Figs. 4 and 5 construction.

Referring again to Figs. 4, 5, 7 and 7A, flux for the other rotors such as 27, 28 on the common shaft 29 is furnished through the medium of additional pole pieces associated with the lateral or vertical portions of the same stator coil 10'. These pole pieces, one of which is shown separately in Figs. 7 and 7A, are of a general hairpin or U shape including substantially parallel legs 30, 31 adapted for reception at the inner and outer faces of the corresponding lateral portion of the coil 10'. For increased efficiency the inner ends 32 of these lateral pole pieces 30—31 may be somewhat bent inward upon an arc substantially following the curvature of the periphery of the rotors 27 and 28 with which they are associated, with an intervening air gap similarly as already described in connection with the preceding views.

As clearly seen in Fig. 5 these lateral pole pieces 30—31 are arranged in opposite relation upon the two side portions of the coil 10'. Their general function and operative effect with respect to the associated rotors 27 and 28 is the same as previously explained in connection with the pole pieces and rotor of Figs. 1 to 3. It will be understood that the stator coil 10' may if desired be further elongated in the direction vertically of the views so as to accommodate any desired number of pole pieces such as 30—31 for cooperation with corresponding rotors upon the same shaft.

Turning now to Figs. 8 and 9, I have there shown an arrangement of extreme simplicity further illustrating the main elements of a motor characteristic of my present invention. In Fig. 8 the stator coil 40 is shown in horizontal section so that the internal parts may be seen in full. The magnetizable disk rotor 42 is rotatively mounted within the coil 40 as by means of a hollow arbor 43 and bearing post 44, the axis of which is located in a plane near the center of the coil. While in this and the preceding views the stator is represented by a single coil, it will be evident that it may be equivalently constituted by two or more coil elements disposed side by side and having a common axis.

Passage of current through the coil 40 develops in the rotor 42 north and south poles positioned substantially in the axis of the coil, as indicated by the letters N and S upon the rotor in Fig. 8. Assuming that only the coil and the rotor are present and that there is no other magnetic material within the field of the coil, then obviously there would be no tendency to cause revolution of the rotor whether the coil is energized by direct or by alternating current. In accordance with the invention, however, magnetizable strips or pole pieces 45, 46 are provided in a position paralleling the coil axis. These strips 45, 46 may be non-magnetically supported in any convenient manner. As seen in end elevation in Fig. 9 they are held by a block of one or more pieces of non-magnetic material, for example wood or a plastic composition, as indicated therein at 48. This magnetic support for the pole pieces 45—46 is such that the latter are approximately tangent to the rotor but with an air gap between the adjacently opposed surfaces, as indicated at 49, 49.

Assuming now that the coil 40 is energized by direct current, north and south poles will be set up about simultaneously in the strips 45, 46, as indicated by the lettering N, S thereon and also in the magnetizable disk of the rotor 42. As thus established, the like poles in the rotor disk 42 and in the strips 45, 46 will repel each other. The disk resultantly tends to turn through an angle in a counter-clockwise direction, indicated by the arrow on Fig. 8. The phenomenon concerned may be observed by replacing the disk 42 by a narrow bar or needle which will be deflected through a counter-clockwise angle out of parallelism with the strips 45, 46.

If these strips or pole pieces 45, 46 were only of such relatively short length that the north and south polarity were developed within or substantially within the confines of the coil, the described turning or deflecting action would not take place. This is because repulsion would occur at both ends of each bar simultaneously. However, when the pole pieces are externally extended in the manner typified in Fig. 8, such that the opposite pole in each piece 45 or 46 is set up at a location outside the coil 40 and where it is relatively remote from the rotor, unsymmetrical forces of repulsion result, tending to move the rotor whether it be a bar or a disk such as 42, through a certain angle and in a counter-clockwise direction under the circumstances as illustrated and described.

In the assumed example of direct current in the coil, if now the current ceases to flow, the rotor whether bar or disk will tend to move further in the same counter-clockwise direction in order to reduce the reluctance of its magnetic flux which will pass from it into the pole pieces 45, 46. Now if current is again passed through the coil but in the opposite direction, the first effect will be to cause the rotor to move still further in the counter-clockwise direction in an effort to align itself in the new field set up in the coil and which is created before the pole pieces 45, 46 become strongly magnetized. Somewhat later the repulsion force between the new reversed poles in the strips or bars 45, 46 cause a still greater rotation in the same and herein counter-clockwise direction. Evidently then successive alternations of the current will tend to accelerate the speed of the rotor up to a final stage at which synchronous speed is reached. At such stage the rotor tends to remain substantially in constant phase with the current. If desired somewhat greater synchronous torque may be had by modification of the thin rotor disk such as 42 in Fig. 8 or those of the preceding figures as by forming therein diametrically opposite apertures such as 41, 41', Fig. 8. This gives a slightly polar character to the rotor tending to check slipping of the magnetized axis once synchronism has been attained.

It will be evident that the main distinction as between the simplified arrangement of Figs. 8 and 9 and those of the preceding views is approximately equivalent to that resultant from employing substantially rectilinear pole pieces, on the one hand, and from bending straight portions of the pieces or strips around the outside of the stator coil and joining them together so as to merge into a single piece of metal. Such latter arrangement somewhat increases the magnetomotive force in the strips because the outer portions are brought closer into the field of the outer conductors of the coil while the other or inner ends of these strips retain the same position within the coil.

The term disk rotor as herein employed throughout will be understood as intending a wheel-like element wherein at least a circumfertial portion has the property of substantial magnetic remanence and the no more than moderately polar character as described. Such main rotative element while generally thin as compared with the diameter may be dimensioned both axially and radially within limits prescribed by the coil, the current and the magnetic forces available.

It will be understood that my invention either as to means or method is not limited to the exemplary embodiments or steps as herein illustrated or described, and I set forth its scope in my following claims:

I claim:

1. A self-starting synchronous motor operable on alternating current and on direct current reversed at relatively long intervals, comprising a stator coil having an axial opening, a wheel-like rotor formed at least circumferentially of material of substantial magnetic remanence, said rotor disposed in the coil opening for rotation on an axis substantially perpendicular to the coil axis and being subject to polarization by the coil along a rotor diameter paralleling the coil axis, and magnetizable strip means including parallel portions oppositely extending in the direction axially of the coil in closely spaced relation to the rotor periphery and terminating within the coil to present dissimilar poles at diametrically opposite regions relative to the rotor axis, the terminal pole of one strip portion spaced from an intermediate section of the other strip portion in a direction making a wide angle to the coil axis, whereby repulsion between like poles in the rotor and in the strip means effects rotation of the rotor at increasing speed up to and maintained at synchrony with the current phase.

2. A self-starting synchronous motor according to claim 1 wherein the parallel portions of the strip means are integrally joined by a length of like material extending externally of the coil.

3. A self-starting synchronous motor according to claim 2 wherein the strip means has the general form of a letter N as viewed in the direction of the rotor axis.

4. A self-starting synchronous motor according to claim 1 wherein the strip means comprises a pair of separate pieces having non-magnetic support within the coil and oppositely extending externally of the coil and each with one end terminal within the coil in the manner stated.

5. A self-starting synchronous motor according to claim 1 wherein the rotor comprises a plurality of axially spaced disks upon a common axis and pole-presenting strip means is provided in operative relation for each rotor disk.

6. A self-starting synchronous motor according to claim 5 wherein an end disk of the plurality has the strip means therefor at the coil portion adjacently paralleling that disk and another disk of the plurality receives operative flux from pole-presenting strip means at portions of the coil lateral to the rotor axis.

7. A self-starting synchronous motor comprising a stator coil, a wheel-like rotor peripherally of permanently magnetizable material in and axially perpendicular to the coil axis so as to be magnetizable by the coil in a direction parallel to the axis of the latter, and magnetizable strip means associated with the coil to present therein dissimilar poles in repulsion relation to the magnetic axis of the rotor in a direction at a substantial angle to the coil axis.

8. A self-starting synchronous motor comprising a stator coil, a circular rotor circumferentially of relatively high magnetic remanence in and axially perpendicular to the coil axis so as to be magnetizable by the coil in a direction parallel to the axis of the latter, and magnetizable strip means of relatively low magnetic remanence associated with the coil to present therein dissimilar poles in repulsion relation to the magnetic axis of the rotor in a direction at a substantial angle to the coil axis.

9. The novel method for making a synchronous electric motor self-starting, which comprises presenting a circumferentially permanently magnetizable rotor and a stator coil in mutually perpendicular axial relation and with the coil surrounding the rotor, energizing the coil so as to develop opposite poles diametrally of the rotor and substantially axially of the coil, and simultaneously setting up peripherally adjacent the rotor other opposite poles angularly offset from the polar diameter of the rotor and thereby causing repulsion between such other poles and like poles of the rotor to produce torque on the latter in a given direction.

10. The method of claim 9 including alternating the current direction in the coil and thereby accelerating the rotor up to synchrony with the current phase.

11. In the operation of synchronous electric motors, the novel method of self starting which comprises polarizing a circular rotor in a given diametral direction and in the same phase establishing stator poles peripherally adjacent the rotor and in such angular relation to the polar diameter thereof that repulsion between like stator and rotor poles effects a turning moment on the rotor.

12. The method according to claim 11 including repetitively alternating the polarizing current and thereby continuing turning of the rotor at increasing speed up to and remaining in synchrony with the current phase.

13. A self-starting synchronous motor comprising a stator coil, a rotor therein with axis perpendicular to the coil axis and having a peripheral portion of selected magnetization for polarization under the influence of the coil, and a magnetizable strip associated with the coil so as to present a pole in repulsion relation to the magnetic axis of the rotor in a direction angular to the coil axis.

HENRY E. WARREN.

No references cited.